United States Patent
Helton et al.

(10) Patent No.: US 6,357,662 B1
(45) Date of Patent: *Mar. 19, 2002

(54) HAND-HELD, DUAL-MODE ASSET TRACKING READER WITH LIGHT-ACTIVATED SWITCH

(75) Inventors: Patrick L. Helton, Marysville; Christopher A. Wiklof, Everett, both of WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/247,165

(22) Filed: Feb. 9, 1999

Related U.S. Application Data (63) Continuation-in-part of application No. 08/581,826, filed on Jan. 2, 1996, now Pat. No. 5,869,840.

(51) Int. Cl.[7] .............................. G06K 7/10; G06K 9/22
(52) U.S. Cl. ........................... 235/462.45; 235/472.01; 235/454; 235/462.48
(58) Field of Search ..................... 235/472.01, 472.02, 235/462.48, 462.43, 462.21, 462.2, 462.13, 462.45, 462.46, 454; 250/221

(56) References Cited

U.S. PATENT DOCUMENTS

| | | |
|---|---|---|
| 4,329,581 A | 5/1982 | Helfrich, Jr. et al. ........ 250/221 |
| 4,937,443 A | 6/1990 | Smoot ........................ 250/221 |
| 4,972,070 A | 11/1990 | Laverty, Jr. ................. 250/221 |
| 5,086,526 A | 2/1992 | Van Marcke ................... 4/623 |
| 5,315,097 A | 5/1994 | Collins, Jr. et al. ..... 235/472.01 |
| 5,340,973 A | 8/1994 | Knowles et al. ......... 235/472.01 |
| 5,354,977 A | * 10/1994 | Roustaei ................ 235/472.01 |
| 5,420,411 A | * 5/1995 | Salatto, Jr. et al. ..... 235/472.01 |
| 5,471,042 A | * 11/1995 | Kirkeby et al. ...... 235/472.01 X |
| 5,496,992 A | * 3/1996 | Madan et al. ........ 235/472.01 X |
| 5,576,531 A | 11/1996 | Murphy ................. 235/472.01 |
| 5,600,121 A | * 2/1997 | Kahn et al. ............ 235/472.01 |
| 5,637,863 A | 6/1997 | Sanborn et al. ............. 250/221 |
| 5,646,596 A | 7/1997 | Gumm ......................... 340/573 |
| 5,869,840 A | * 2/1999 | Helton .................. 235/472.01 |

FOREIGN PATENT DOCUMENTS

JP 62-147578 7/1987

* cited by examiner

Primary Examiner—Michael G. Lee
Assistant Examiner—Jamara A. Franklin
(74) Attorney, Agent, or Firm—Joan H. Pauly (57) ABSTRACT

One or more reading devices are disposed within a hollow case sized and shaped to be held in a user's hand. A supplemental switch is also disposed in the case and is manually activatable by a user, such as by the user's thumb. Logic disposed in the case is connected to a reading device and the supplemental switch for taking a first action when the switch is activated and taking a second action when it is not. The first and second actions may comprise first and second modes of operation of the reading device. When two or more reading devices are provided, the first and second actions may include reading operations of the first and second devices, respectively. Types of reading devices that may be incorporated into embodiments of the invention include bar code scanners, RF ID interrogators, and smart card scanners.

20 Claims, 7 Drawing Sheets

HAND-HELD, DUAL-MODE ASSET TRACKING READER WITH LIGHT-ACTIVATED SWITCH

This application is a continuation-in-part of application Ser. No. 08/581,826, filed Jan. 2, 1996, now U.S. Pat. No. 5,869,840, issued Feb. 9, 1999.

DESCRIPTION

1. Technical Field

This invention relates to hand-held asset tracking readers and, more particularly, to a hand-held, dual-mode reader having a supplemental switch manually activatable by a user and logic for taking a first action when the supplemental switch is not activated and for taking a second action when the supplemental switch is activated.

2. Background Information

In manufacturing, transportation, and other industries, it is frequently desirable to keep track of and/or be able to identify or obtain information from assets. As used herein, the term "assets" is intended to be understood to include products, packages, and other inanimate objects, as well as individual personnel or nonhuman living individuals. There are various ways in which assets are tracked and/or identified. Bar codes are perhaps the most widely known device for tracking and identifying assets. Bar codes may be of the one-dimensional type commonly seen on consumer products or, more recently, of a two-dimensional type. Other identifying devices include passive and active RF (radio frequency) ID (identification) tags and smart cards. Smart cards may be of the type, for example, that includes an input/output, a microprocessor, and a memory, and that will not allow information to be read without authorization. Authorization may be provided via a microprocessor in the reading device, such as by the user inputting a personal identification number.

Known reading devices for reading bar codes, RF ID tags, or smart cards are limited to reading one type of identifier and are generally very restricted in their modes of operation. Thus, in order to have the capacity to read various types of identifiers, an inventory of a number of different types of readers is required. This problem of the need to have available a number of different readers is increasing in severity as the use of a plurality of types of identifiers in single installations increases. For example, labels on packages or identification badges for personnel may include both a bar code and an RF ID tag.

Figures 1, 2:
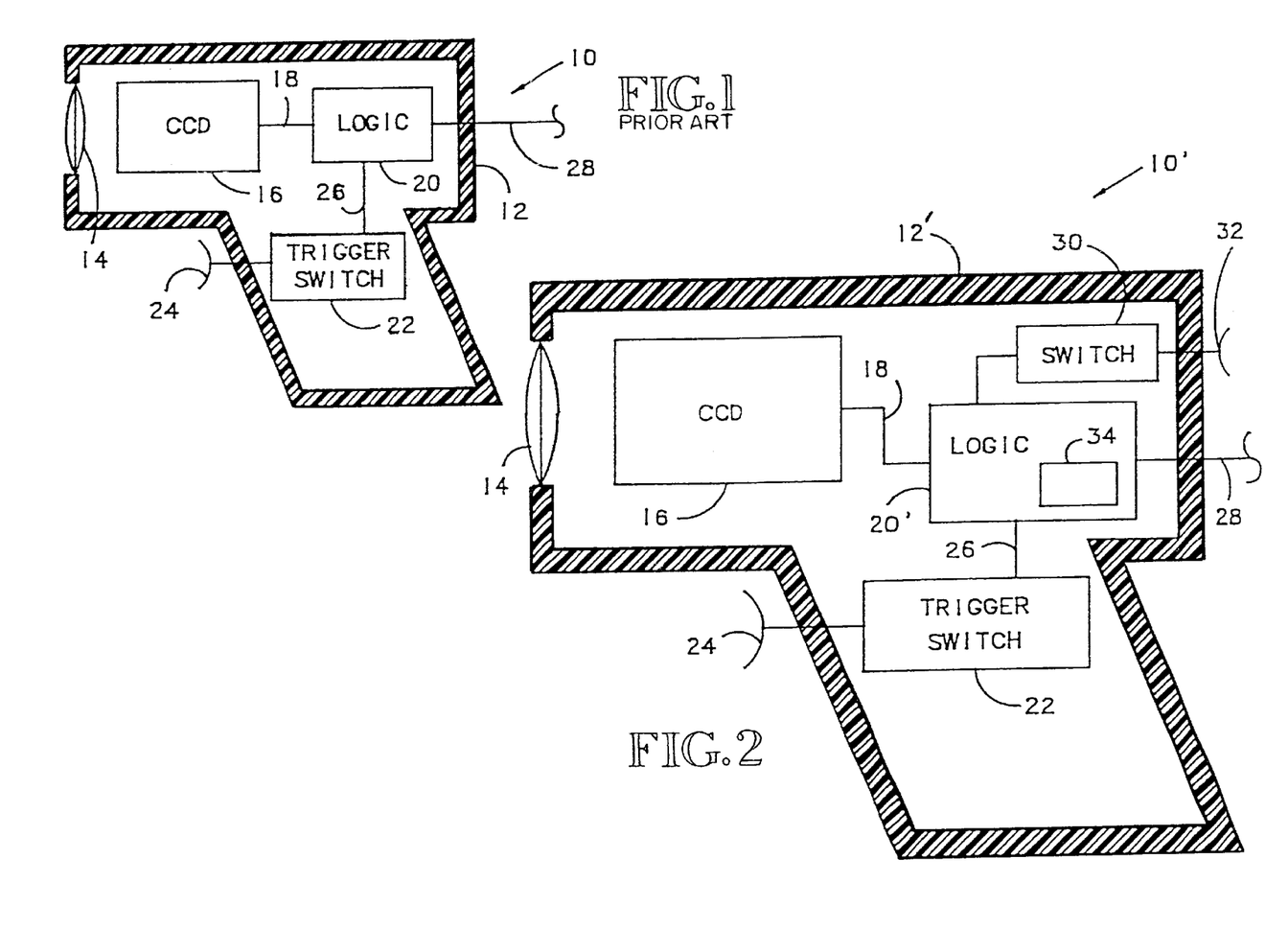
FIG. 1 is a simplified partially schematic sectional view of a prior art hand-held bar code scanner.
FIG. 2 is like FIG. 1 except that it shows a first embodiment of the invention comprising a dual-mode, hand-held bar code scanner.

As an example of a known reading device, a typical prior art two-dimensional bar code reader is depicted in simplified form in FIG. 1 where it is generally indicated as 10. The bar code reader 10 has a hand-held case 12 of so-called "pistol-grip" shape containing the components required to scan a two-dimensional bar code. There is a lens system 14 which focuses a field of view (not shown) containing a bar code on a charge coupled device (CCD) 16. The CCD is, of course, an element that is commonly used in video cameras. The CCD constantly outputs a signal on line 18 containing the two-dimensional pixel data of what is being "seen" by the lens system 14. In the bar code reader 10, the output line 18 is input to the logic 20. There is also a trigger switch 22 which is operated by manually depressing the trigger button 24. The trigger switch 22 is also connected to the logic 20 by line 26. The signal out of the bar code reader 10 appears on line 28 from the logic 20. This is, of course, a greatly simplified depiction and the logic 20, for example, can be structured to completely analyze the output from the CCD 16 or merely pass it on for decoding by other logic connected to line 28.

In use, the bar code reader 10 is pointed at a bar code at its focal point by means not important to the present invention. Then the bar code is in focus, the trigger button 24 is pressed causing the logic 20 to snapshot or freeze the then output data on line 18. That snapshot of data can then be analyzed according to techniques which also form no part of the present invention and, for that reason, will not be addressed in any detail herein. According to one aspect of such bar code readers as being developed by the assignee of this application, the logic 20 analyzes each bar code read to see if it is a data bar code or a reader reprogramming bar code. Thus, there must be uniquely recognizable reprogramming bar codes and the logic 20 must be able to recognize them. By that arrangement, the bar code reader 10 can be reprogrammed to recognize and decode a particular type of bar code from several possibilities by first having it scan a reprogramming bar code associated with the bar code type to be recognized.

In another aspect of such prior art bar code readers, there may be a pattern of actions taken each time that a particular user may wish to avoid as overly time consuming or redundant under particular circumstances. For example, if the hand-held bar code reader 10 is placed in a solid mount at the focal distance from bar codes to be scanned, there is no need for the bar code reader 10 to go through the pre-scanning process of guiding the user to the focal distance. In such cases, it would be desirable for the user to be able to deactivate that feature from the reader 10.

The conception of the present invention began with an appreciation of the limitations of presently available reading devices, including the bar code reader described above, and the desirability of providing reading devices that are more flexible in the types of identifiers they can read and/or their modes of operation.

SUMMARY OF THE INVENTION

The subject of the invention is a hand-held, dual-mode asset tracking reader. According to an aspect of the invention, the reader comprises a hollow case sized and shaped to be held in a user's hand and a reading device disposed within the case in a position for receiving information from an asset. The device has an output outputting a signal representing received information. A primary switch and a secondary switch are both disposed within the case. The primary switch is connected to the reading device and is manually activatable by a user while gripping the case to initiate a reading process. The secondary switch is manually activatable by a user while gripping the case and activating the primary switch. Logic is disposed within the case and connected to the device, the primary switch, and the secondary switch for taking first and second actions. The first action is taken when the primary switch is activated by a user but the secondary switch is not activated. The second action is taken when both the primary switch and the secondary switch are activated by a user. The first action comprises processing the signal from the output of the reading device.

The primary and secondary switches may take various forms. Preferably, the manually activatable primary switch is positioned to be activated by a user's finger, and the secondary switch is positioned to be activated by a user's thumb. In the preferred embodiments of the invention, the secondary switch includes a photodiode and is operated by blocking and unblocking a path for light to strike the photodiode.

The reading device may take various forms. In a first group of embodiments, the reading device comprises a bar code scanner. The first action comprises processing the signal as representing information from a one-dimensional bar code. The second action comprises processing the signal as representing information from a two-dimensional bar code. The bar code scanner may also be a two-dimensional scanner having dual modes of operation. For example, the first action may comprise processing the signal in an area read mode, and the second action may comprise processing the signal in a line read mode.

In another group of embodiments, the reading device comprises an RF ID interrogator, and the first and second actions comprise first and second modes of operation, respectively, of the interrogator. For example, the first and second modes of operation may comprise specifying first and second ranges, respectively, of an operating parameter. Operating parameters that may be so specified include tag protocols, ID frequencies, and power levels.

The asset tracking reader may further comprise a second reading device disposed within the case in a position for receiving information from an asset. When a second reading device is included, the second action may comprise operation of the second reading device.

According to another aspect of the invention, the asset tracking reader comprises the hollow case described above and first and second reading devices disposed within the case, each in a position for receiving information from an asset. A primary switch and a secondary switch are each also disposed within the case and are connected to the first device and the second device, respectively. The primary switch is activatable to initiate a reading process. The secondary switch is manually activatable by a user while gripping the case. Logic is disposed within the case and connected to the first and second devices and the primary and secondary switches for taking first and second actions. The first action is taken when the primary switch is activated. The second action is taken when the secondary switch is activated by a user. The first action comprises a reading operation by the first reading device, and the second action comprises a reading operation by the second reading device.

The first and second reading devices may both be of the same type, e.g. both be types of bar code scanners or RF ID interrogators, or may be of different types. As the invention is presently contemplated, each of the first and second devices may be a bar code scanner, an RF ID interrogator, a smart card scanner, or any other tracking device of similar purpose.

According to still another aspect of the invention, the asset tracking device comprises a hollow case, as described above, a reading device disposed within the case in a position for receiving information from an asset, a supplemental switch, and logic. The switch is disposed within the case and is manually activatable by a user. The logic is disposed within the case and is connected to the reading device and the supplemental switch for taking a first action when the supplemental switch is not activated by a user and for taking a second action when the supplemental switch is activated by a user. The first and second actions comprise first and second modes of operation, respectively, of the reading device.

The first and second actions may be of the type described above or of some other type. For example, when the reading device is an RF ID interrogator, the first and second actions may include reading RF ID tags and writing to RF ID tags. As used herein, the term "writing to" is intended to include updating information as well as providing new information on a blank or partially blank tag. Alternatively, the second action may comprise signaling an RF ID tag to provide a location signal perceptible to a human, while the first action is some other mode of operation of the interrogator. Still another alternative is first and second actions that include reviewing and ignoring preamble information.

The present invention has a number of advantages. It ameliorates the problem discussed above of the need to have available a number of different readers. The invention allows the type of reading functions and/or the modes of operation of a particular kind of reader to be combined in one asset a tracking reader to reduce the number of readers that must be on hand at a particular installation. The ability to combine reading capabilities of different types of identifying devices (bar code, RF ID tags, smart cards, etc.) in one reader or to vary the mode of operation of a reader for a particular kind of identifying device greatly increases the versatility and efficiency of the reader. In turn, it can increase the cost effectiveness of asset tracking by reducing the amount of time required for the user of the reader to obtain the needed information. All this is accomplished without increasing the cost of hardware, and potentially even decreasing the cost of hardware, and without sacrificing the ability to obtain identifying information by means of a hand-held reader that may be used in various types of installations and, when necessary, out in the field.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 3 is a flowchart of exemplary logic that can be employed in the scanner of FIG. 2.

FIGS. 4 and 5 are sectional views of a first embodiment of a radiant energy-activated switch suitable for use in embodiments of the invention. In FIGS. 4 and 5, the switch is shown as being turned off and on, respectively.

BEST MODES FOR CARRYING OUT THE INVENTION

The drawings show apparatus that is constructed according to the invention and also constitutes the best modes for carrying out the invention currently known to the applicant. As discussed above, the invention is directed toward a hand-held, dual-mode asset tracking reader. The reader of the invention may include a single reading device with dual modes of operation. It may also include first and second reading devices of the same or different types and have a first mode of operation using the first reading device and a second mode of operation using the second reading device.

The concept of the invention is sufficiently broad to encompass readers having more than two modes of operation. The term "dual-mode", as used herein, is intended to indicate at least two modes of operation and possibly more than two. For example, the secondary or supplemental switch of the invention may be a three-position toggle switch that has an intermediate position corresponding to a third mode of operation.

The reading device or devices of embodiments of the invention may be of various types and may include bar code scanners, RF ID interrogators, smart card scanners, and various devices for reading other types of identifying information. FIGS. 2 and 3, 10 and 11, and 14 and 15 illustrate three examples of devices constructed according to the invention. These examples are provided and described herein for the purpose of illustrating the invention. It is intended to be understood that the asset tracking reader of the invention may also take various other forms without departing from the spirit and scope of the invention.

FIG. 2 shows a first embodiment of the invention comprising an asset tracking reader 10' having a basic structure like that of the bar code reader shown in FIG. 1. In accordance with the invention, the reader 10' has dual modes of operation. The first mode of operation is the same as the operation of the reader 10 shown in FIG. 1 and described above.

Referring to FIG. 2, the reader 10' has a case 12'. A supplemental switch 30 is contained within the case 12' and connected to the logic 20'. For user convenience, the trigger button 24 is depressed by a user's index finger in the usual manner for pistol grip devices while the supplemental switch 30 is positioned so as to be activated by the user's thumb at 32 in a manner described in greater detail below.

Figures 3, 4, 5:
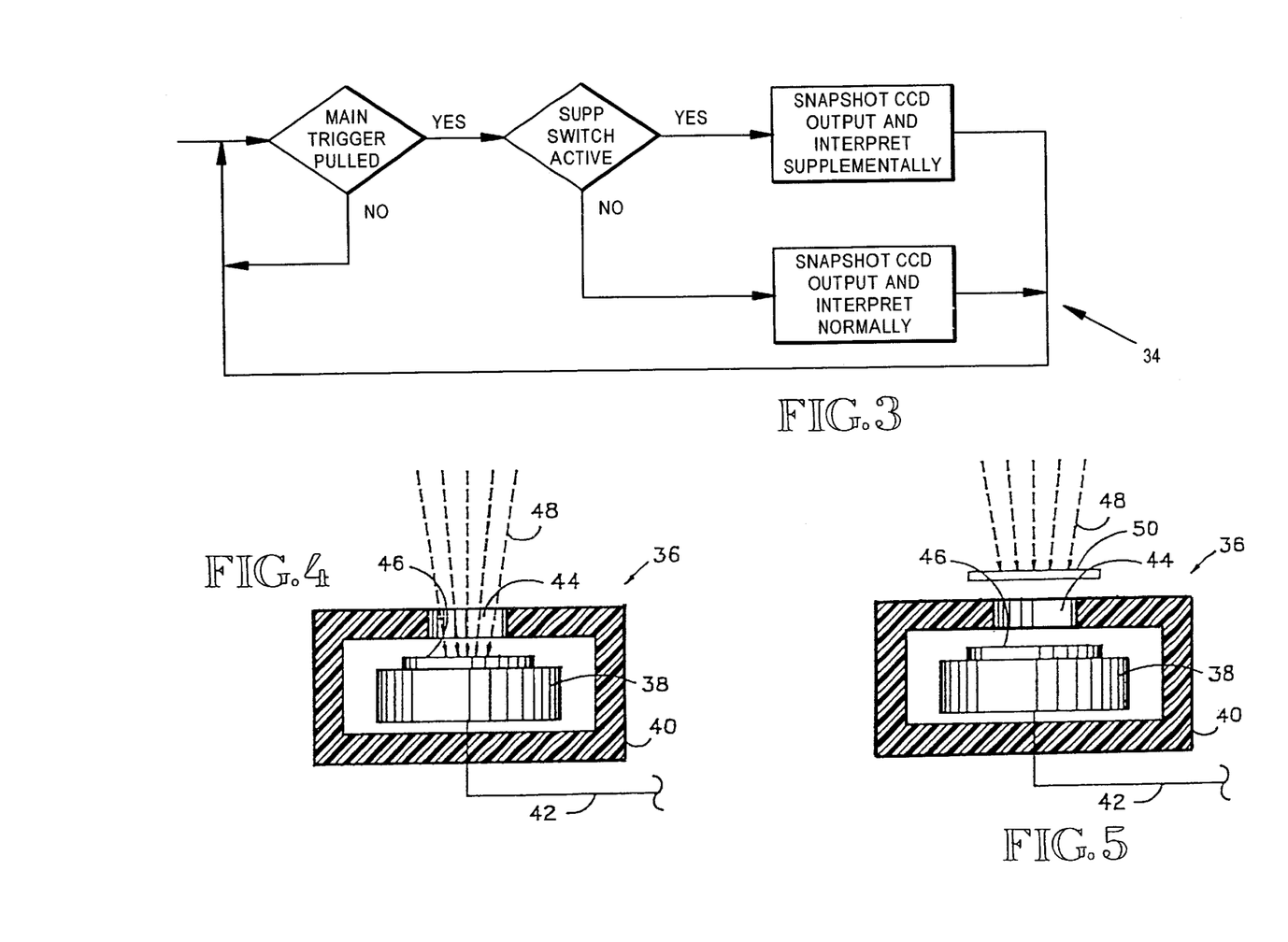

The logic 20' contains additional logic 34 such as that given by way of example in FIG. 3. As those of ordinary skill in the art will readily recognize and appreciate, the logic 34 is by way of example only and is not limiting in any way. The supplemental switch 30 can be employed in a variety of ways according to the desired features of the reader 10'. As can be seen in FIG. 3, the logic 34 is a loop function that watches to see if the main trigger button 24 has been depressed. When it has been depressed, the logic 34 then looks to see if the supplemental switch 30 has been activated by the user. If it has not, the CCD output 18 is snapshotted and interpreted as described above. If the supplemental switch 30 is active, the logic 34 takes an alternate path. While not depicted in FIG. 3, the activation of the supplemental switch 30 could also be recognized independently of the primary switch 22. Such a modification would be readily accomplished by those of ordinary skill in the art without undue experimentation.

As described above, the embodiment shown in FIG. 2 incorporates a particular type of two-dimensional bar code reader. Embodiments of the invention having the basic structure shown in FIG. 2 may also include different types of reading devices. For example, the illustrated two-dimensional bar code reader may be replaced by a different two-dimensional bar code reader or a one-dimensional bar code reader. It may also be replaced by an RF ID interrogator or smart card scanner or some other device.

Whatever the nature of the reading device, the logic illustrated in FIG. 3 may be employed, with the major variation being in the first and second actions indicated at the right of FIG. 3. For example, if the reading device is a bar code scanner, the first action may be processing the signal output by the device as representing information from a one-dimensional bar code, and the second action may be processing the signal as representing information from a two-dimensional bar code. If the device is a two-dimensional bar code scanner, the first action may comprise processing the signal in an area read mode, and the second action may comprise processing the signal in a line read mode. In embodiments in which the reading device is an RF ID interrogator and the first and second actions comprise first and second modes of operation of the interrogator, the modes of operation may take various forms. For example, the modes of operation may comprise specifying first and second ranges, respectively, of an operating parameter. Examples of operating parameters that may be varied in first and second modes of operation are tag protocols, ID frequencies, and power levels. The modes of operation may also include reading RF ID tags and writing to REF ID tags, respectively. Another alternative is to provide a second action comprising signaling an RF ID tag to provide a location signal perceptible to a human. Still another alternative is to program the reader to have first and second actions of reviewing and ignoring preamble information, respectively.

FIGS. 4 and 5 illustrate a light-activated switch 36 that is a preferred embodiment of the supplemental switch 30 shown in FIG. 2. The switch 36 is shown in simplified form as to its method of operation. A photodiode 38 or other light-activated device is mounted in a light-sealed case 40 and the signal output line 42 thereof brought from the case 40. An opening 44 is provided in the case 40 over the light sensing surface 46 of the photodiode 38 so as to allow ambient light 48 to enter the case 40 and strike the surface 46, as depicted in FIG. 4, thereby causing a signal to be output on line 42. The configuration of FIG. 4 with a signal present on line 42 represents the "off" status of the switch 36. The switch 36 is turned "on" as depicted in FIG. 5 by blocking the light 48 from entering the opening 44 as with a blocking member 50. Thus, the absence of a signal on line 42 represents the switch 36 being on.

Figures 6, 7:
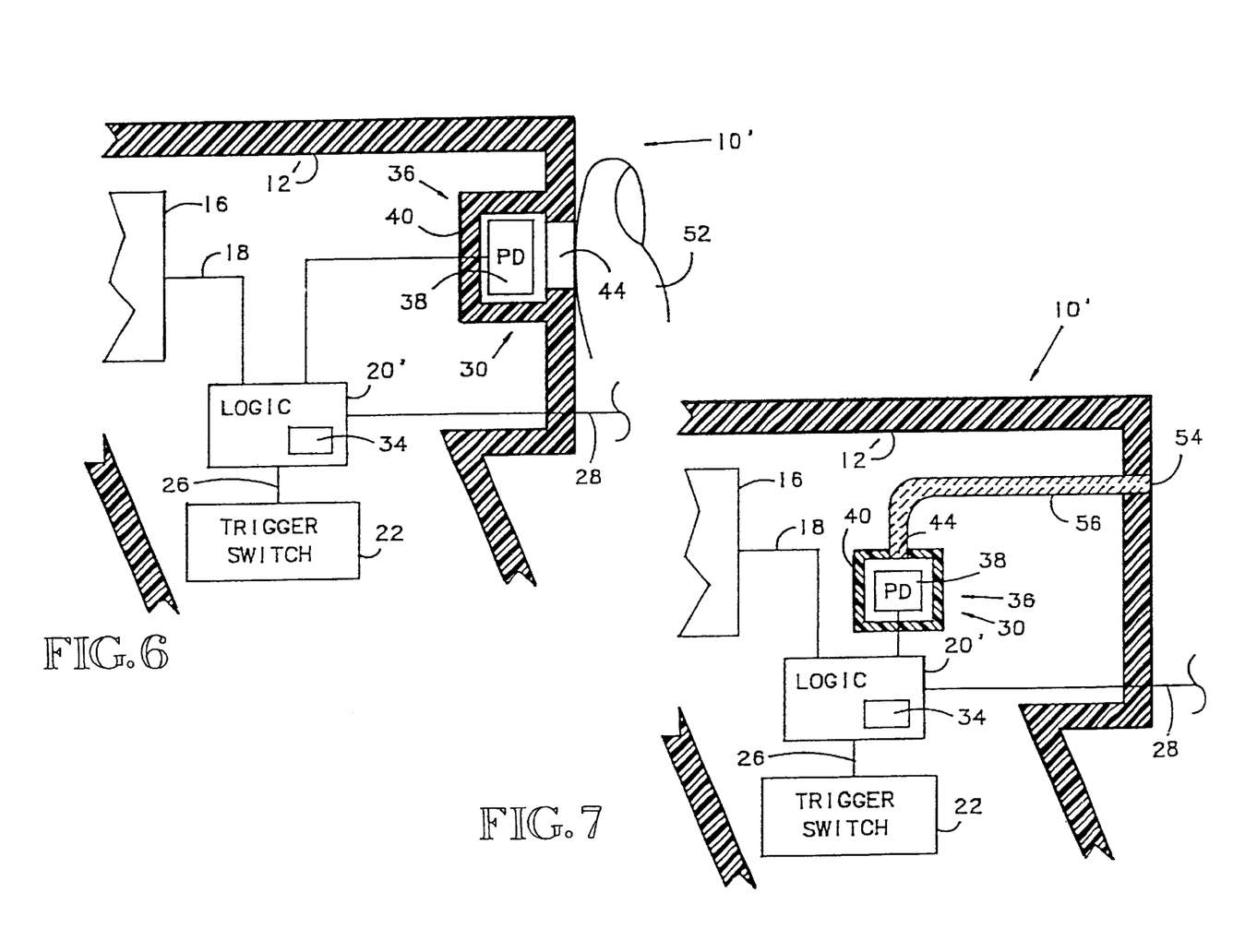
FIG. 6 is an enlarged sectional view of the rear of a bar code scanner constructed according to the invention, such as the scanner shown in FIG. 2, incorporating the switch of FIGS. 4 and 5.
FIG. 7 is like FIG. 6 except that it shows a modification of the arrangement for mounting the radiant energy switch.

Two possible implementations of the switch 36 in a reader 10' are depicted in FIGS. 6 and 7. In the embodiment of FIG. 6, the case 40 containing the photodiode 38 is built into the case 12' of the reader 10' and the opening 44 is in the case 12' at a position convenient for covering by the thumb 52 of the user. In the embodiment of FIG. 7, the case 40 containing the photodiode 38 is contained separately within the case 12' of the reader 10' and the opening 44 in the case 40 is connected to an opening 54 in the case 12' at a position convenient for covering by the thumb 52 of the user by a light pipe 56 of any type well-known to those of ordinary skill in the art such as, for example, a bundle of optic fibers.

Figure 8:
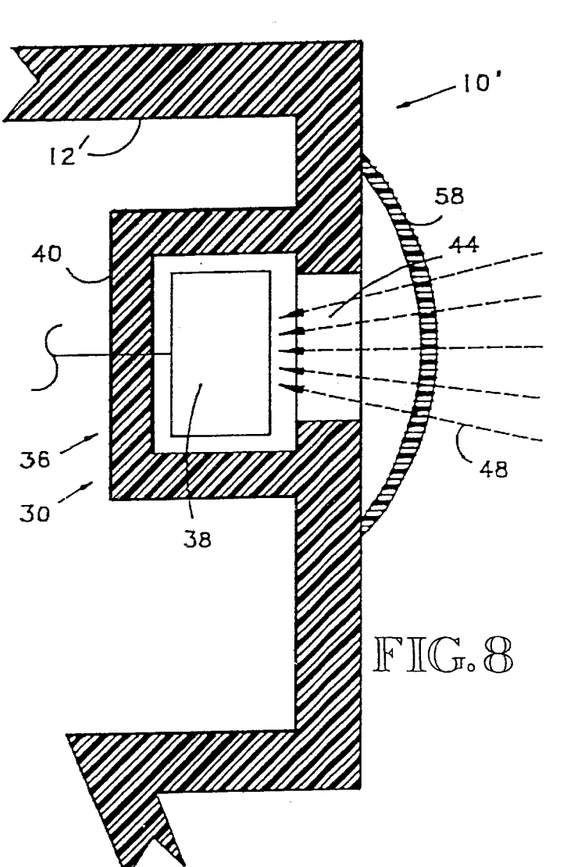
FIGS. 8 and 9 are fragmentary sectional views of the rear of a pistol-grip type of asset tracking reader incorporating a modified form of the switch shown in FIGS. 4 and 5.
Figure 9:
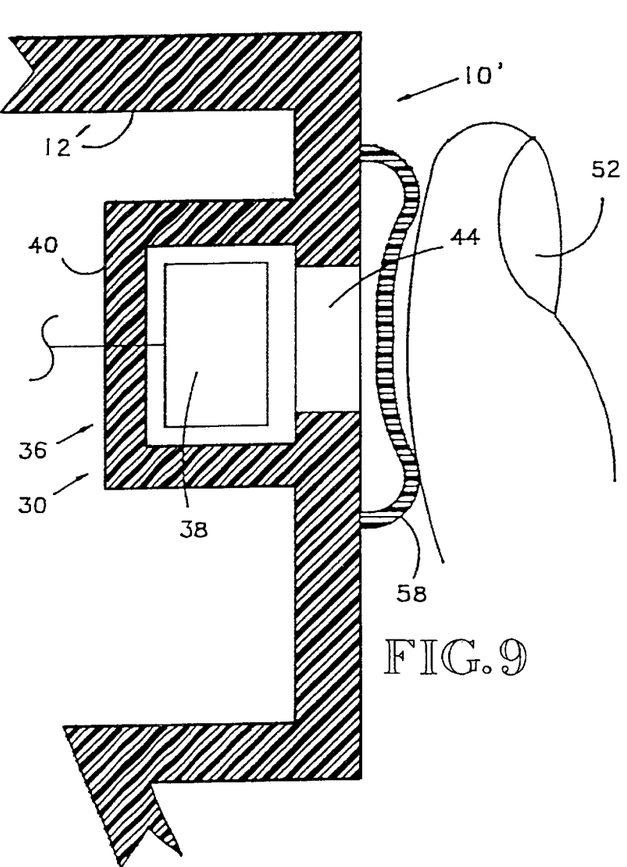

As can be appreciated, while it is well-suited for use in the reader 10' of the present invention, the light-activated switch 36 of this invention can be employed to advantage in numerous applications. For some users and in some applications, the switch 36 of FIGS. 6 and 7 may need to have a tactile feel and/or an accompanying sound when activated. This can be accomplished as depicted in FIGS. 8 and 9. A transparent or translucent plastic dome 58 such as those used in so-called "membrane" switches or the like is disposed over the opening 44. Light 48 passes through the dome 58 to strike the light sensing surface 46 of the photodiode 38 and place it in the "off" state. When the user's thumb 52 is pushed against the dome 58, the dome 58 "oilcans" to snap into the position of FIG. 9, giving an audible "click" and a tactile feel while the user's thumb 52 is moved into position to close the opening 44 and turn the switch 36 "off".

Figure 10:
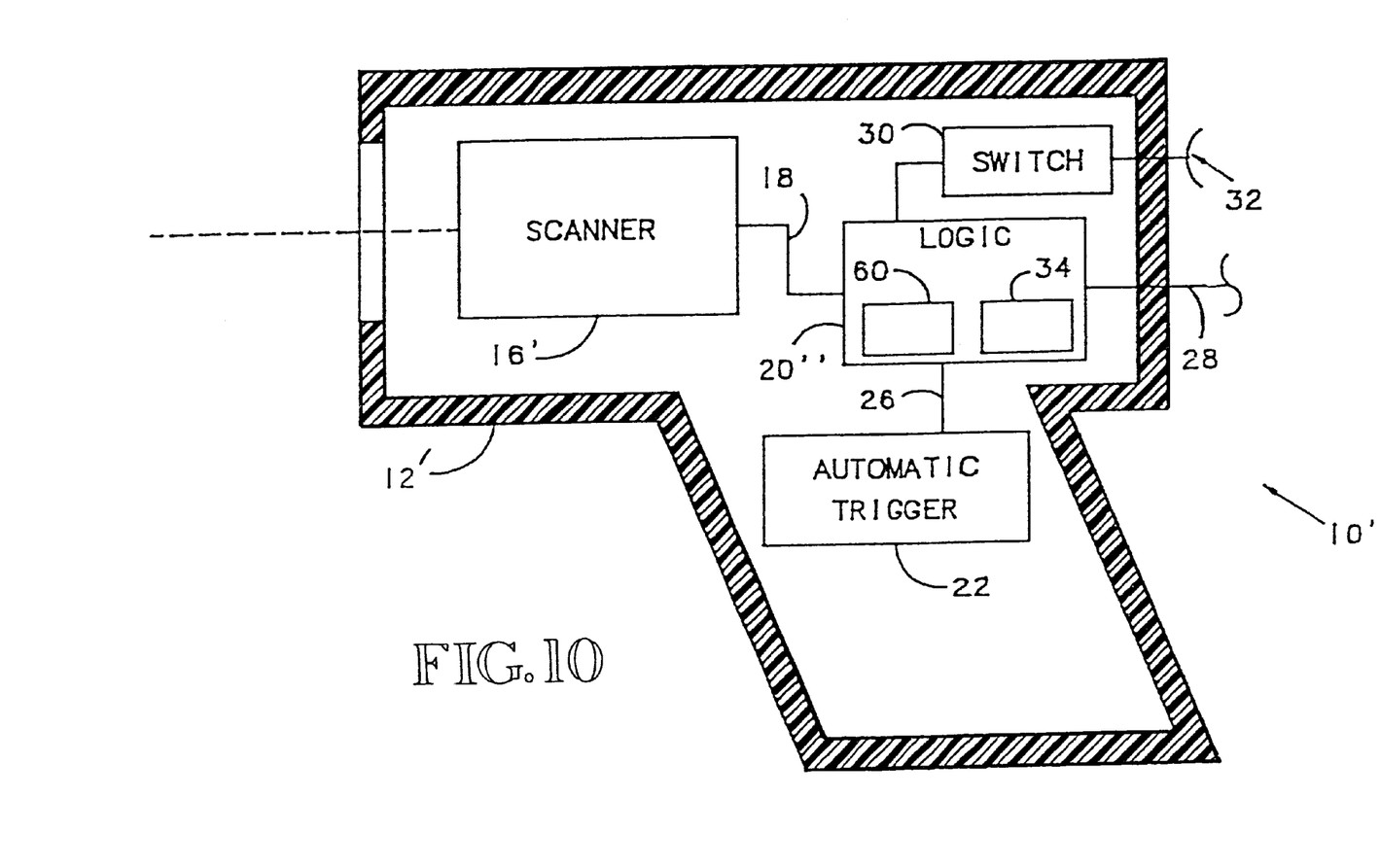
FIG. 10 is similar to FIG. 2 except that it shows a modification of the asset tracking reader in which the trigger is activated automatically rather than manually.

A second embodiment of the invention is shown in FIG. 10. It comprises a reader 10" including a bar code scanner. In the reader 10", the CCD 16 of FIG. 2 has been replaced by a generic "scanner" 16', which can be of any type providing scan information to the logic 20" on the line 18. The logic 20" is a dual-mode logic containing a primary logic 60 as well as the additional logic 34. A "supplemental" switch 30 is again contained within the case 12' and connected to the logic 20". The manually activated switch 22, however, has been replaced by an automatic trigger 22' which may, in fact, be part of the logic 20". The point is that the supplemental switch 30 is supplemental to a switching function out of the control of the operator. But, the "supplemental" switch 30 is still supplemental in function as will be seen.

Figure 11:
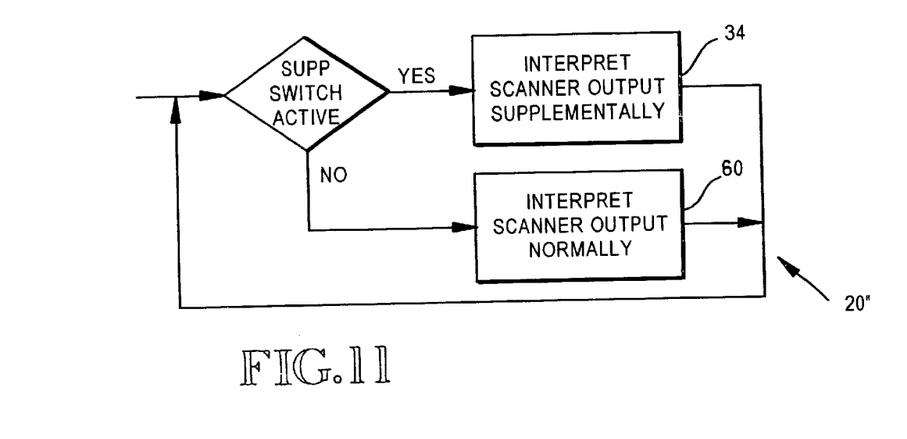
FIG. 11 is a flowchart of exemplary logic that can be employed in the reader shown in FIG. 10.

The logic 20" contains logic such as that given by way of example in FIG. 11. As in the earlier case of FIG. 3, the logic of FIG. 11 is by way of example only and is not limiting in any way. The supplemental switch 30 can be employed in a variety of ways according to the desired features of the reader 10". As can be seen in FIG. 11, the logic 22" is a loop function that watches to see if the supplemental trigger "button" 32 has been depressed, i.e. if the supplemental switch 30 has been turned "on". When it has not, the scanner output 18 is interpreted by the primary logic 60. If the supplemental switch 30 is active, the logic 22" takes an alternate path. In short, the logic 22" is a dual-mode logic which operates in a first mode as long as the supplemental switch 30 is "off" and operates in an alternate second mode when the supplemental switch 30 is "on".

Figure 12:
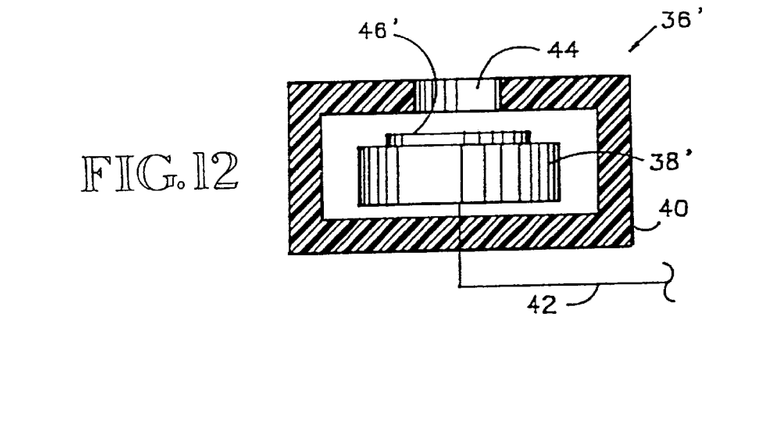
FIGS. 12 and 13 are sectional views of a second embodiment of a radiant energy-activated switch suitable for use in embodiments of the invention.
Figure 13:
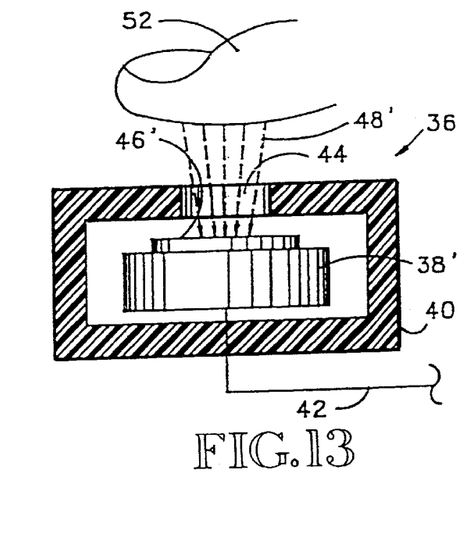

Turning now to FIGS. 12 and 13, another energy-activated switch 36' suitable for use in embodiments of the invention is shown in simplified form as to its method of operation. An infrared (IR) activated photodiode 38' or other IR-activated device is mounted in a light-sealed case 40 and the signal output line 42 thereof brought from the case 40. An opening 44 is provided in the case 40 over the IR-sensing surface 46' of the photodiode 38'. The configuration of FIG. 12 with no signal present on line 42 represents the "off" status of the switch 36'. The switch 36' is turned "on" as depicted in FIG. 13 by placing a finger 52 or other IR-emitting object over the opening 44 sodas to allow IR energy 48' to enter the case 40 and strike the surface 46' thereby causing a signal to be output.

Figures 14, 15:
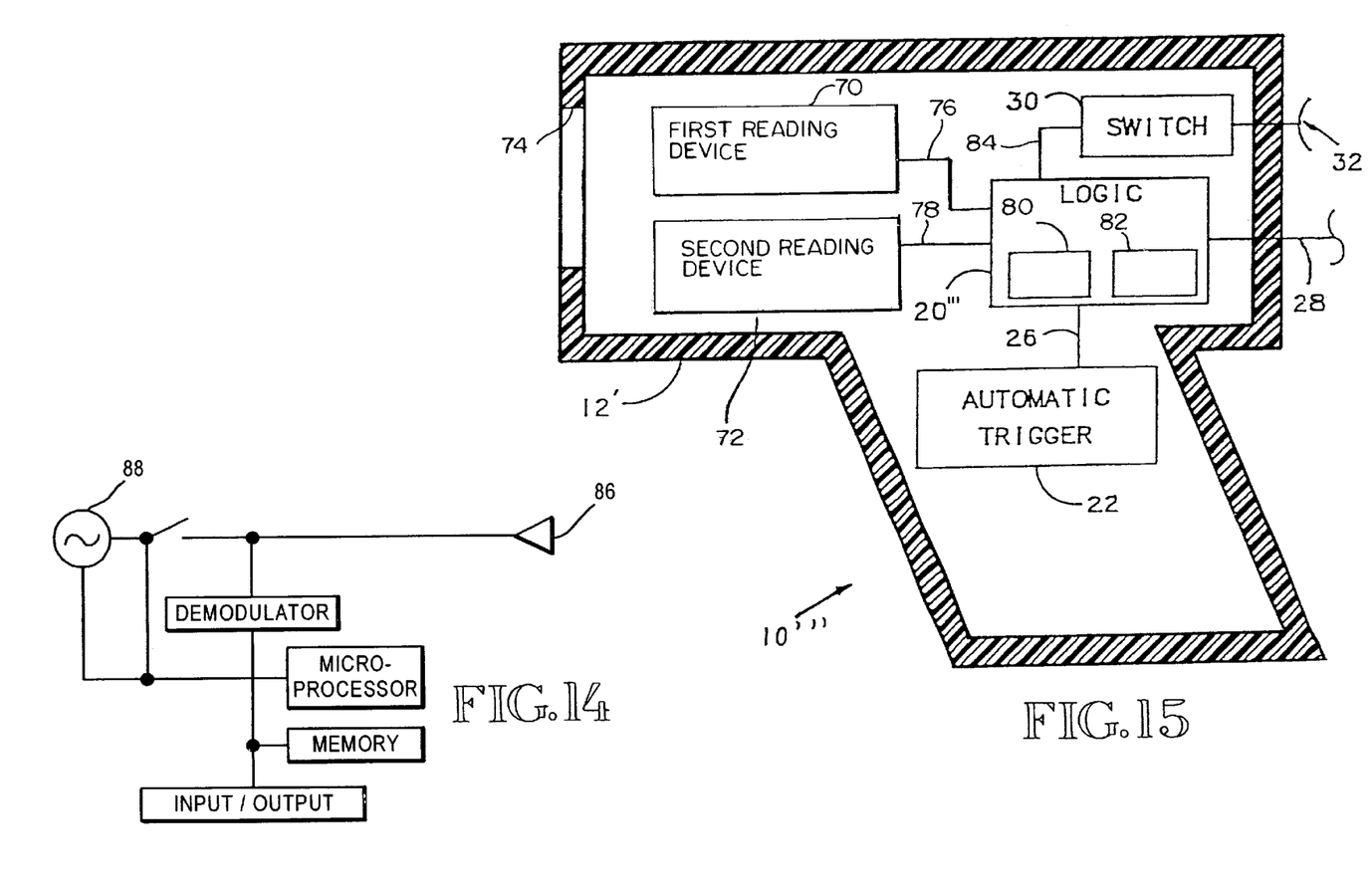
FIG. 14 is a block diagram of the components of a type of RF ID interrogator that is currently being contemplated for use in embodiments of the invention.
FIG. 15 is like FIG. 10 except that it shows an embodiment including first and second reading devices.

FIG. 15 illustrates another embodiment of the invention that includes first and second reading devices 70, 72. Like the other embodiments described above, the reader 10'" shown in FIG. 15 has a hollow case 12' sized and shaped to be held in a user's hand. As shown, the reader 10'" has an automatic trigger switch 22 like the embodiment of FIG. 10. It could also be provided with the type of manually activated trigger switch shown in FIGS. 1 and 2, which has a trigger button 24 positioned to be activated by a user's finger. Each of the two reading devices 70, 72 is disposed within the case 12' in a position for receiving information from an asset. FIG. 15 shows the case 12' as being provided with a window 74 through which information from the asset can be received by one or both of the reading devices 70, 72. Depending on the type of reading devices included in the embodiment, the window 74 may be included or omitted and, if included, may be varied in its positioning and sizing. The trigger switch 22 is a primary switch disposed within the case and connected to the first device 70. It is activatable to initiate a reading process by the device 70. The switch 30 is a secondary switch disposed within the case and connected to the second device 72. It is manually activatable by a user gripping the case 12' in a known manner.

The device 10'" includes logic 20'" disposed within the case and connected to the first and second devices 70, 72, the primary trigger switch 22, and the secondary switch 30. The respective lines of connection to the logic 20'" include the line 76 to the first reading device, the line 78 to the second reading device, the line 26 to the trigger switch 22, and the line 84 to the secondary switch 30. The logic 20'" includes logic 80 for taking a first action when the trigger switch 22 is activated to accomplish a reading operation by the first reading device 70. It also includes logic 82 for taking a second action when the secondary switch 30 is activated to accomplish a reading operation by the second reading device 72.

FIG. 14 is a block diagram of the components of a type of RF ID interrogator that is currently viewed as a desirable type of interrogator for use in embodiments of the invention. The components of the interrogator are shown in FIG. 14 in a generalized manner but sufficiently to enable one of ordinary skill in the art of RF ID interrogators to make and use the interrogator. Referring to FIG. 14, the interrogator includes a number of standard components. These components include an input/output, a memory, a microprocessor, a demodulator, an antenna 86, and an oscillator 88. Although the interrogator configuration illustrated in FIG. 14 is currently viewed as preferable, other interrogator configurations may also be used in embodiments of the invention without departing from the spirit and scope of the invention. Suitable interrogators include those manufactured by Micron Communications, Boise, Id., Texas Instruments, Inc., Dallas, Tex., Systems Limited, Manchester, England, and Motorola/Indala.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A hand-held, dual-mode asset tracking reader comprising:

a) a hollow case sized and shaped to be held in a user's hand;

b) a reading device disposed within said case in a position for receiving information from an asset, said device having an output outputting a signal representing received information;

c) a primary switch disposed within said case connected to said device, said switch being manually activatable by a user while gripping said case to initiate a reading process;

d) a secondary switch disposed within said case manually activatable by a user while gripping said case and activating said primary switch; and e) logic disposed within said case connected to said device, said primary switch, and said secondary switch for taking a first action when said primary switch is activated by a user but said secondary switch is not activated and for taking a second action when both said primary switch and said secondary switch are activated by a user, said first action comprising processing said signal.

2. The reader of claim 1, wherein said primary switch is positioned to be activated by a user's finger, and said secondary switch is positioned to be activated by a user's thumb.

3. The reader of claim 1, wherein said secondary switch includes a photodiode and is operated by blocking and unblocking a path for light to strike said photodiode.

4. The reader of claim 1, wherein the reading device comprises a bar code scanner, said first action comprises processing said signal as representing information from a one-dimensional bar code, and said second action comprises processing said signal as representing information from a two-dimensional bar code.

5. The reader of claim 1, wherein the reading device comprises a two-dimensional bar code scanner, said first action comprises processing said signal in an area read mode, and said second action comprises processing said signal in a line read mode.

6. The reader of claim 1, wherein the reading device comprises an RF ID interrogator, and said first and second actions comprise first and second modes of operation, respectively, of said interrogator.

7. The reader of claim 6, wherein said first and second modes of operation comprise specifying first and second ranges, respectively, of an operating parameter.

8. The reader of claim 7, wherein said parameter is one of tag protocols, ID frequencies, and power levels.

9. The reader of claim 1, which further comprises a second reading device disposed within said case in a position for receiving information from an asset, and in which said second action comprises operation of said second reading device.

10. A hand-held, dual-mode asset tracking reader comprising:

a) a hollow case sized and shaped to be held in a user's hand;

b) a reading device disposed within said case in a position for receiving information from an asset, said device having an output outputting a signal representing received information;

c) a primary switch disposed within said case connected to said device;

d) a secondary switch disposed within said case manually activatable by a user while gripping said case; and e) logic disposed within said case connected to said device, said primary switch, and said secondary switch for taking a first action when said primary switch is activated but said secondary switch is not activated and for taking a second action when both said primary switch and said secondary switch are activated, said first action comprising processing said signal.

11. The reader of claim 10, wherein the reading device comprises a bar code scanner.

12. The reader of claim 11, wherein said first action comprises processing said signal as representing information from a one-dimensional bar code, and said second action comprises processing said signal as representing information from a two-dimensional bar code.

13. The reader of claim 11, wherein the reading device comprises a two-dimensional bar code scanner; and said first action comprises processing said signal in an area read mode, and said second action comprises processing said signal in a line read mode.

14. The reader of claim 10, wherein the reading device comprises an RF ID interrogator, and said first and second actions comprise first and second modes of operation, respectively, of said interrogator.

15. The reader of claim 14, wherein said first and second modes of operation comprise specifying first and second ranges, respectively, of an operating parameter.

16. The reader of claim 14, wherein said first and second actions include reading RF ID tags and writing to RF ID tags.

17. The reader of claim 14, wherein said second action comprises signaling an RF ID tag to provide a location signal perceptible to a human.

18. The reader of claim 14, wherein said first and second actions include reviewing and ignoring preamble information.

19. The reader of claim 15, wherein said parameter is one of tag protocols, ID frequencies, and power levels.

20. The reader of claim 10, which further comprises a second reading device disposed within said case in a position for receiving information from an asset, and in which said second action comprises operation of said second reading device.

* * * * *